US010828914B1

(12) United States Patent
Chung et al.

(10) Patent No.: US 10,828,914 B1
(45) Date of Patent: Nov. 10, 2020

(54) DETECTION DEVICE

(71) Applicant: Teco Image Systems Co., Ltd., Taipei (TW)

(72) Inventors: Ming-Chieh Chung, Taipei (TW); Ting-Chun Chen, Taipei (TW)

(73) Assignee: TECO IMAGE SYSTEMS CO., LTD., Taipei (TW)

( * ) Notice: Subject to any disclaimer, the term of this patent is extended or adjusted under 35 U.S.C. 154(b) by 0 days.

(21) Appl. No.: 16/723,017

(22) Filed: Dec. 20, 2019

(30) Foreign Application Priority Data

Dec. 13, 2019 (TW) .............................. 108145718 A

(51) Int. Cl.
*B41J 11/00* (2006.01)
*B65H 63/00* (2006.01)
*B65H 63/06* (2006.01)

(52) U.S. Cl.
CPC ............ *B41J 11/006* (2013.01); *B65H 63/00* (2013.01); *B65H 63/06* (2013.01)

(58) Field of Classification Search
CPC ......... B65H 63/00; B65H 63/06; B41J 11/006
See application file for complete search history.

(56) References Cited

U.S. PATENT DOCUMENTS

| 2007/0147919 A1* | 6/2007 | Lim | ................... G03G 21/1638 399/388 |
| 2015/0103124 A1* | 4/2015 | Imamura | ................ B41J 11/002 347/102 |
| 2019/0217639 A1* | 7/2019 | Nishida | ..................... B65H 7/08 |
| 2019/0300311 A1* | 10/2019 | Takayama | .............. B65H 5/064 |

* cited by examiner

*Primary Examiner* — Huan H Tran
(74) *Attorney, Agent, or Firm* — Kirton McConkie; Evan R. Witt

(57) ABSTRACT

A detection device is disclosed for detecting an abnormal object in a printing path. The detection device includes a first frame body, a first rotation shaft, two flexible portions and a detection module. The first rotation shaft is pivotally connected to the first frame body and has a first central axis. The two flexible portions are disposed at two opposite ends of the first rotation shaft along the first central axis, to provide an initial torque. Each flexible portion is connected between the first rotation shaft and the first frame body. The detection module includes a detection plate connected to the first rotation shaft. When the detection plate is forced by the abnormal object, the detection plate drives the first rotation shaft against the initial torque to rotate around the first central axis, so that the detection module detects the rotation of the first rotation shaft and the detection plate.

11 Claims, 17 Drawing Sheets

DETECTION DEVICE

FIELD OF THE INVENTION

The present disclosure relates to a detection device, and more particularly to a detection device having coaxial elastic structures and applied to a printer.

BACKGROUND OF THE INVENTION

With the development of inkjet technology, the efficiency of the inkjet head is getting higher and higher, and the speed of the carrier carrying the inkjet head is also getting faster and faster. However, when the ink carriage is moving at high speed, if an abnormal object is dropped into the printing path, it will easily cause collision at high speed. In addition to damage the machine, it may also cause personnel damage. Therefore, the detection device disposed with the carrier for detecting the abnormal object in the printing path is extremely important.

On the other hand, with the development of additive manufacturing technology in recent years, the printing speed has also been greatly improved, so that the additive manufacturing has been utilized in mass production. Comparing to the conventional manufacturing, the restrictions of the additive manufacturing is fewer. While designing a product, the additive manufacturing can be utilized to improve the performance of the product. Therefore, whether in the field of conventional inkjet printer or the additive manufacturing, it is very important to detect the abnormal object in the printing path.

The conventional detection device applied to the printer mainly includes a detection plate in combination with a tension spring to provide an initial torque during detection. However, since the direction of force exerted on the detection plate by the tension spring is not parallel to the detection plate, the detection plate has to overcome the initial torque and the static friction force during detecting the abnormal object. Consequently, the conventional detection device fails to respond to the abnormal status in time, and the stopping time of the carrier is delayed. Furthermore, with the structure of connecting the tension spring to the lateral side of the detection plate, the initial torque generated by the tensional spring is acted toward a specific direction relative to the printing path. The detection plate has to overcome different initial torques when the detection plate reciprocates in the printing path for detecting, and it causes that the detection sensitivity is inconsistent.

Therefore, there is a need of providing a detection device having coaxial elastic structures and applied to a printer, to address the above-mentioned issues.

SUMMARY OF THE INVENTION

An object of the present disclosure is to provide a detection device applied to a printer. By combining the coaxial elastic structures with the detection plate, the same initial torque is provided when the detection plate reciprocates in the printing path, so as to ensure that the detection sensitivity of the detection plate is consistent. When an abnormal object is dropped into the printing path, it can be detected in time, to avoid the high-speed collision and the damage to the machine or personnel.

Another object of the present disclosure is to provide a detection device applied to a printer. The detection device having coaxial elastic structures is produced into one piece by for example the additive manufacturing technology. At least two spiral flexible portions are formed on both sides of the rotation shaft, respectively, and the detection plate is connected to the rotation shaft and pivotally connected to the frame of the detection device. It is advantageous of eliminating a lot of complicated assembly procedures. Since the at least two spiral flexible portions and the rotation shaft are coaxial, when the detection plate is forced to rotate in the forward direction or the reverse direction, the at least two spiral flexible portions on the rotation shaft are deformed, and the central axis of the at least two spiral flexible portions and the rotation shaft is maintained. Thus, a stable initial torque is provided to the detection plate. On the other hand, since the force generated due to the deformation of the at least two spiral flexible portions is not orthogonal to the rotation shaft, none of friction is generated between the detection plate and the frame body, and it is beneficial to avoid the problem of detection delay. In addition, the deformation of the at least two spiral flexible portions is generated along the central axis of the rotation shaft, and the initial torque is formed along the central axis of the rotation shaft for the detection plate. Moreover, since a certain gap is maintained between the two ends of the detection plate and the frame body, none of friction is generated therebetween. Thus, the detection device applied to the printer can respond immediately when the abnormal objects is detected in the print path. In addition, the initial torque generated by the at least two spiral flexible portions in the axial direction of the rotation shaft also has advantage of overcoming the axial vibration, which is caused by the vibration of the detection device of the printer during high-speed motion. It is beneficial to reduce the generation of noise.

A further object of the present disclosure is to provide a detection device applied to a printer. By providing a first auxiliary flexible portion such as an S-shaped flexible structure, the initial torque provided to the detection plate can be increased. Since the first auxiliary flexible portion is connected between the frame body and the rotation shaft, when the detection plate drives the rotation shaft to rotate, one end of the first auxiliary flexible portion connected to the rotation shaft generates an angle change and a height change, wherein the angle change is greater than the height change. In case that a large torque is provided, when the detection plate drives the rotation shaft to rotate, a non-axial force generated is not excessive relative to the rotation shaft. It is advantage of reducing the friction of rotation, and making the detection plate more sensitive when the detection plate touches the abnormal object. Thus, the abnormal object is detected in time, the printer can be stopped immediately and the accident is avoided. On the other hand, when the detection device adopts a design of detecting in one-way printing path, the frame body further includes a first frame body and a second frame body, which are pivotally connected to each other by a second rotation axis and have second auxiliary flexible portions, for example spiral flexible structures. The second auxiliary flexible portions are connected between the first frame body and the second frame body to provide an elastic restoring force. It is beneficial to prevent the detection device from being damaged by an accidental touch or an accidental collision in the printing path.

In accordance with an aspect of the present disclosure, there is provided a detection device. The detection device is configured to detect an abnormal object in a printing path of a printer. The detection device includes a first frame body, a first rotation shaft, at least two flexible portions and a detection module. The first rotation shaft is pivotally connected to the first frame body and has a first central axis spatially corresponding to and orthogonal to the print path. The at least two flexible portions are disposed on two opposite ends of the first rotation shaft along the first central axis, respectively, and configured to provide the first rotation shaft with an initial torque. Each of the at least two flexible portions includes a first end in connection with the first rotation shaft and a second end in connection with the first frame body. The detection module is configured to detect a rotation of the first rotation shaft relative to the first frame body and includes a detection plate. The detection plate includes a first side and a second side opposite to each other, and the first side is in connection with the first rotation shaft. When the second side of the detection plate is forced by the abnormal object during detecting in the printing path, the detection plate drives the first rotation shaft against the initial torque and is rotated around the first central axis, so that the detection module detects the rotation of the first rotation shaft and the detection plate.

In an embodiment, the detection module further includes an optical sensor and a detecting portion. The optical sensor is disposed on the first frame. The detecting portion spatially corresponds to the optical sensor and is in connection with the first rotation shaft. When the second side of the detection plate is subjected a force by the abnormal object during detecting in the printing path, the detection plate drives the first rotation shaft to rotate the detecting portion with a displacement, and the optical sensor detects the displacement of the detecting portion, so that the detection module detects the rotation of the first rotation shaft and the detection plate.

In an embodiment, the first frame body includes at least two first pivoting holes, and the first rotation shaft is pivotally connected to the first frame body through the at least two first pivoting holes.

In an embodiment, the first frame body includes a plurality of pivoting portions having a plurality of second pivoting holes, wherein the first rotation shaft is pivotally connected to the first frame body through the plurality of second pivoting holes.

In an embodiment, the flexible portion is a spiral flexible structure and is integrally formed into one piece with the first rotating shaft.

In an embodiment, the detection device further includes at least two first auxiliary flexible portions spatially corresponding to the at least two flexible portions and in connection between the first rotation shaft and the first frame body, wherein each of the at least two first auxiliary flexible portions includes a first end in connection with the first rotation shaft, and a second end in connection with the first frame body, wherein the first end of the first auxiliary flexible portion and the first rotation shaft have a connection point opposite to a connection point of the first side of the detection plate and the first rotation shaft.

In an embodiment, the first auxiliary flexible portion is an S-shaped flexible structure, and is integrally formed into one piece with the first frame body and the first rotation shaft.

In an embodiment, the detection device further includes a second frame body and at least two second auxiliary flexible portions. The second frame body includes a second rotation shaft, which is pivotally connected to the first frame body and has a second central axis parallel to the first central axis. The at least two second auxiliary flexible portions are connected between the first frame body and the second frame body, and are configured to provide an elastic restoring force when the first frame body is rotated relative to the second frame body around the second central axis.

In an embodiment, the second auxiliary flexible portion is a spiral flexible structure.

In an embodiment, the second frame body includes at least two first connecting components spatially corresponding to the at least two second auxiliary flexible portions, wherein each of the at least two second auxiliary flexible portions includes a first end and a second end opposite to each other, and a second connecting component, wherein the first end is in connection with the first frame body, the second connecting component is disposed at the second end, and the second connecting component is engaged with the corresponding first connecting component, so that the at least two second auxiliary flexible portions are in connection with the second frame body.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
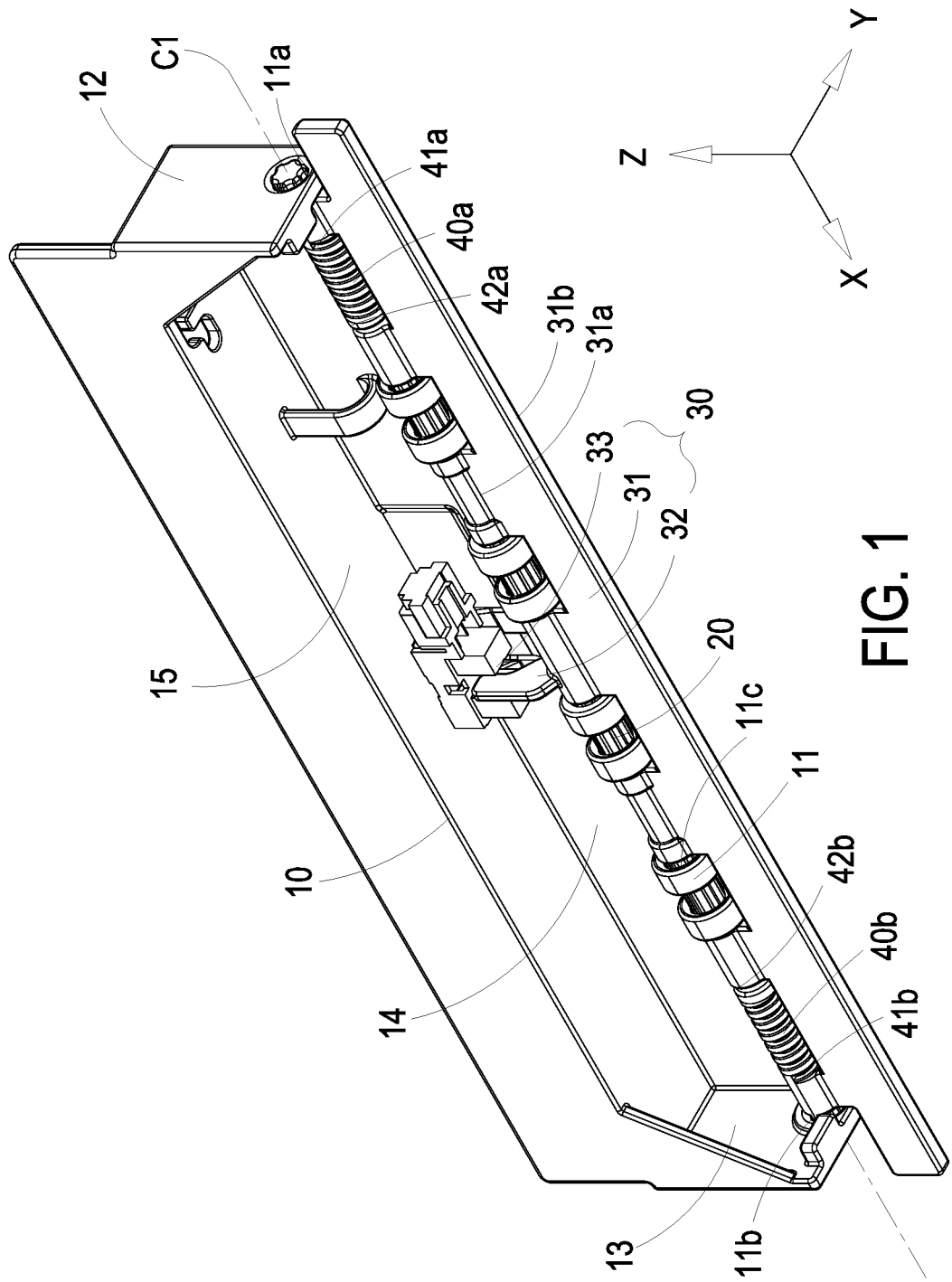
FIG. 1 is a schematic structural view illustrating a detection device according to a first embodiment of the present disclosure.
Figure 2:
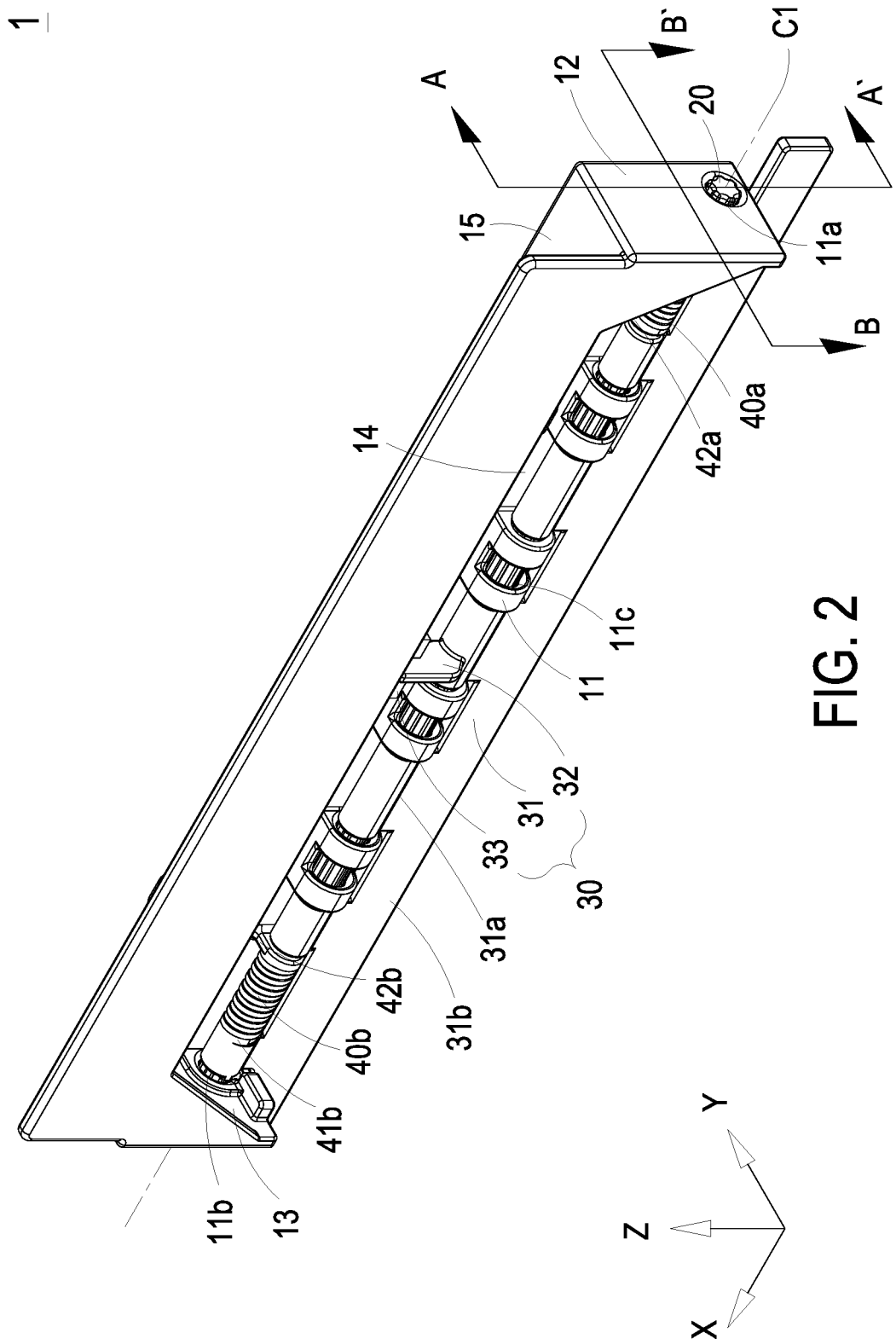
FIG. 2 is a schematic structural view illustrating the detection device according to the first embodiment of the present disclosure and taken from a different perspective.
Figure 3:
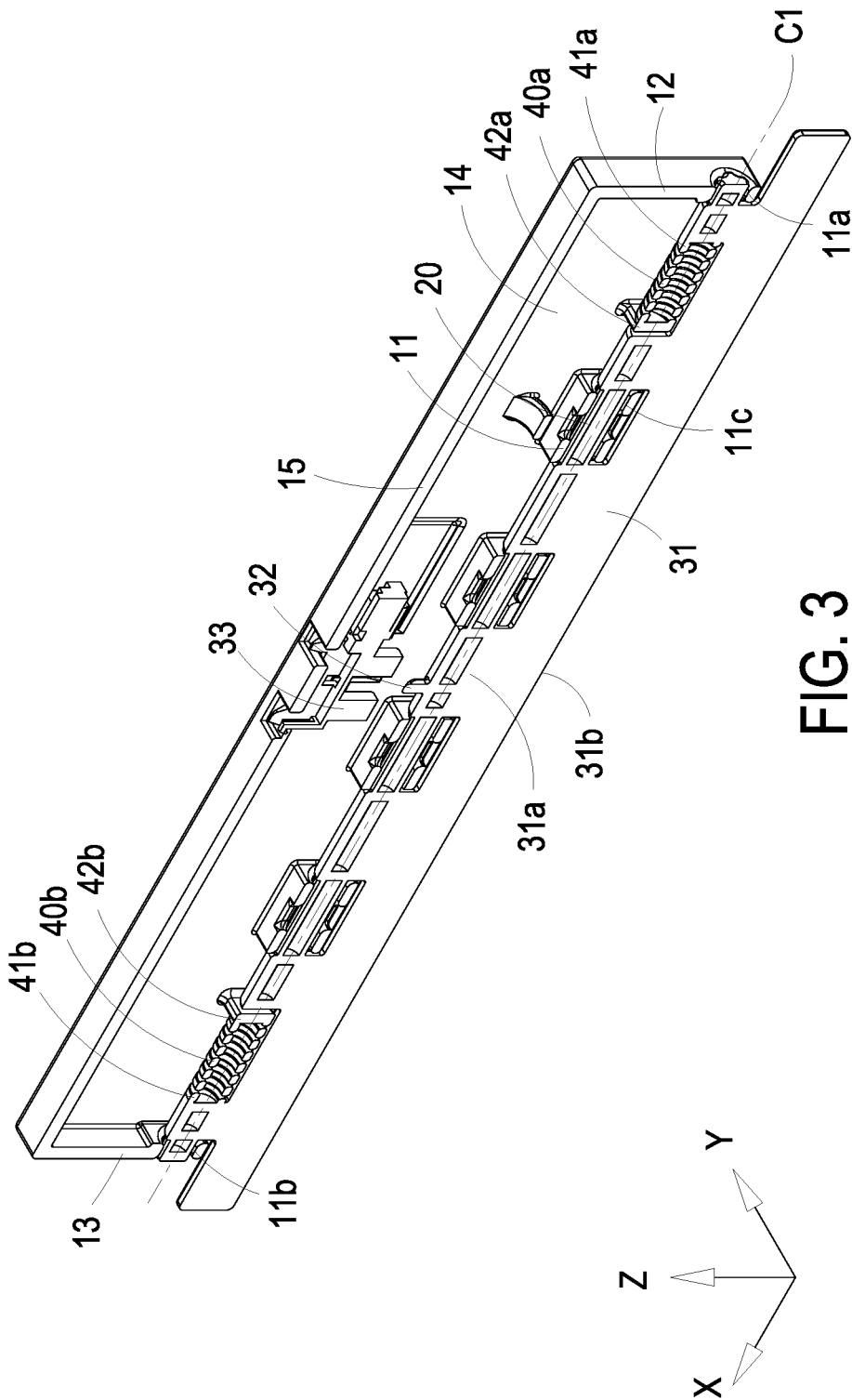
FIG. 3 is a sectional structural view taken along line AA' in FIG. 2.
Figure 4:
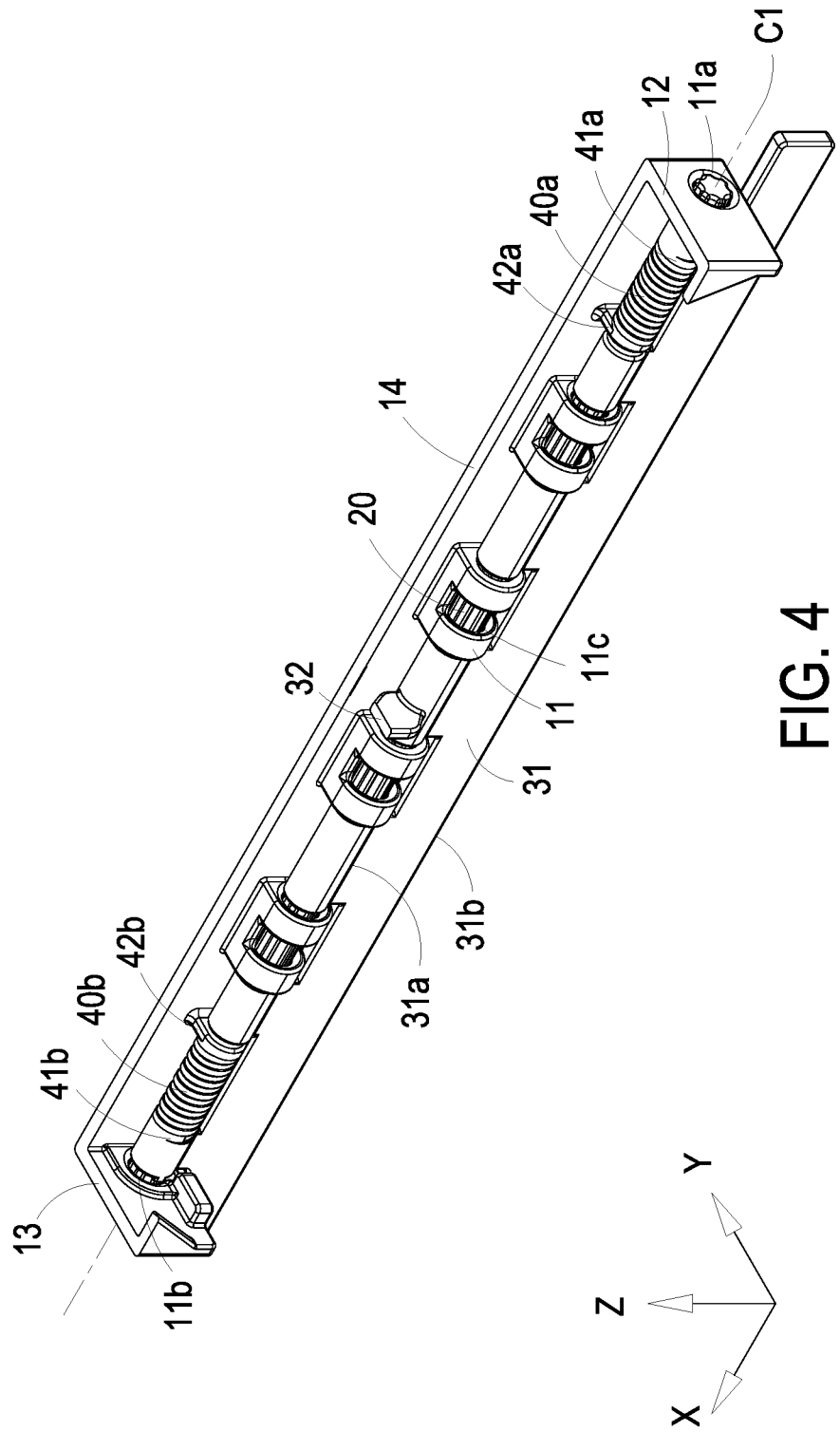
FIG. 4 is a sectional structural view taken along line BB' in FIG. 2.

FIG. 1 is a schematic structural view illustrating a detection device according to a first embodiment of the present disclosure. FIG. 2 is a schematic structural view illustrating the detection device according to the first embodiment of the present disclosure and taken from a different perspective. FIG. 3 is a sectional structural view taken along line AA' in FIG. 2. FIG. 4 is a sectional structural view taken along line BB' in FIG. 2. In the embodiment, the detection device 1 is applied to for example a printer, and configured to detect an abnormal object in a printing path of the printer, for example along the Y axis or opposite to Y axis. The detection device 1 includes a first frame body 10, a first rotation shaft 20, at least two flexible portions 40a, 40b and a detection module 30. The first frame body 10 includes two opposite lateral plates 12, 13, a rear plate 14 and a top plate 15. The rear plate 14 and the top plate 15 are in connection with each other. The two lateral plates 12, 13 are connected with each other through the rear plate 14 and the top plate 15. The first rotation shaft 20 is pivotally connected to the first frame body 10 and has a first central axis C1. Preferably but not exclusively, the first central axis C1 is parallel to the X axis, spatially corresponds and orthogonal to the print path. In the embodiment, the first frame body 10 includes at least two first pivoting holes 11a, 11b disposed on the two opposite lateral plates 12, 13, respectively. The first rotation shaft 20 is pivotally connected to the first frame body 10 through the at least two first pivoting holes 11a, 11b. Furthermore, in the embodiment, the first frame body 10 further includes a plurality of pivoting portions 11 having a plurality of second pivoting holes 11c. The first rotation shaft 20 is pivotally connected to the first frame body 10 through the plurality of second pivoting holes 11c. It should be noted that the manner of pivotally connecting the first rotating shaft 20 to the first frame 10 is not an essential feature, and the present disclosure is not limited thereto. In the embodiment, the at least two flexible portions 40a, 40b are disposed on two opposite ends of the first rotation shaft 20 along the first central axis C1, respectively, and configure to provide the first rotation shaft 20 with an initial torque. Preferably but not exclusively, the at least two flexible portions 40a, 40b are a spiral flexible structure, respectively, and integrally formed into one piece with the first rotation shaft 20. In the embodiment, the flexible portion 40a includes a first end 41a in connection with the first rotation shaft 20, and a second end 42a in connection with the first frame body 10. The flexible portion 40b includes a first end 41b in connection with the first rotation shaft 20, and a second end 42b in connection with the first frame body 10. In the embodiment, the detection module 30 is configured to detect a rotation of the first rotation shaft 20 relative to the first frame body 10.

The detection device 30 includes a detection plate 31, a detecting portion 32 and an optical sensor 33. The detection plate 31 includes a first side 31a and a second side 31b opposite to each other. The first side 31a is in connection with the first rotation shaft 20. Notably, by utilizing the additive manufacturing technology, the at least two flexible portions 40a, 40b are integrally formed into one piece with the first rotation shaft 20 and the detection plate 31, and the first rotation shaft 20 in pivotal connection with the first frame body 10 is achieved. It is not an essential feature, and the present disclosure is not limited thereto. In the embodiment, when the second side 31b of the detection plate 31 is subjected a force by the abnormal object during detecting in the printing path, the detection plate 31 drives the first rotation shaft 20 against the initial torque, and is rotated around the first central axis C1, so that the detection module 30 detects the rotation of the first rotation shaft 20 and the detection plate 31.

Figure 5:
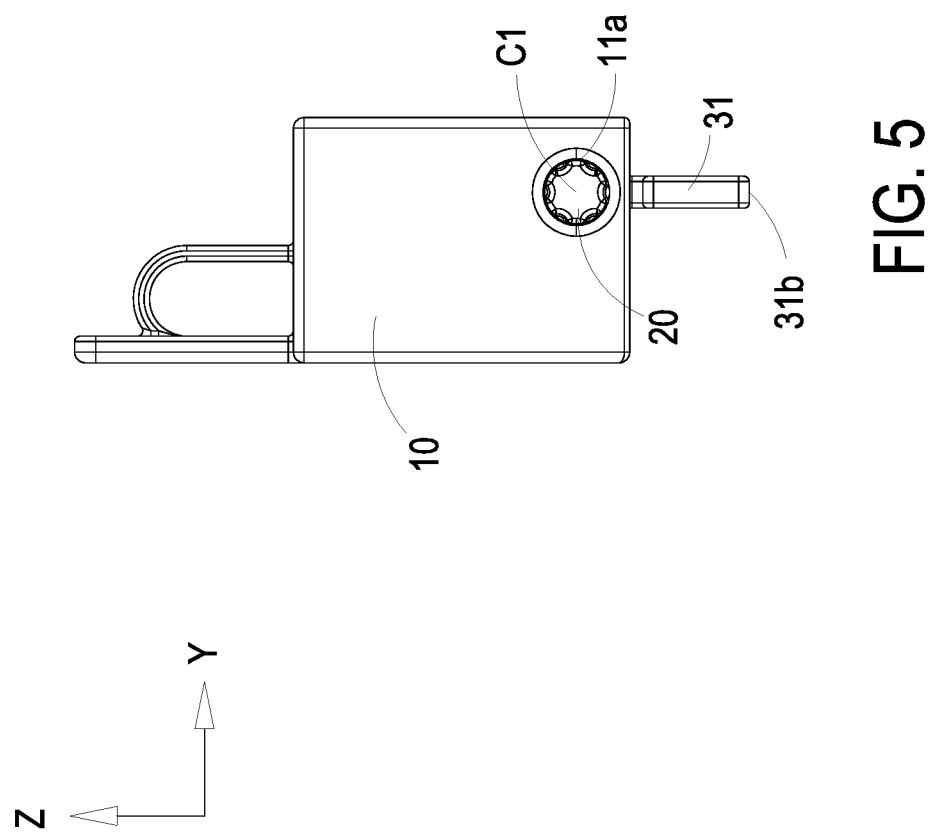
FIG. 5 shows the detection device operated in an initial status according to the first embodiment of the present disclosure.
Figure 6:
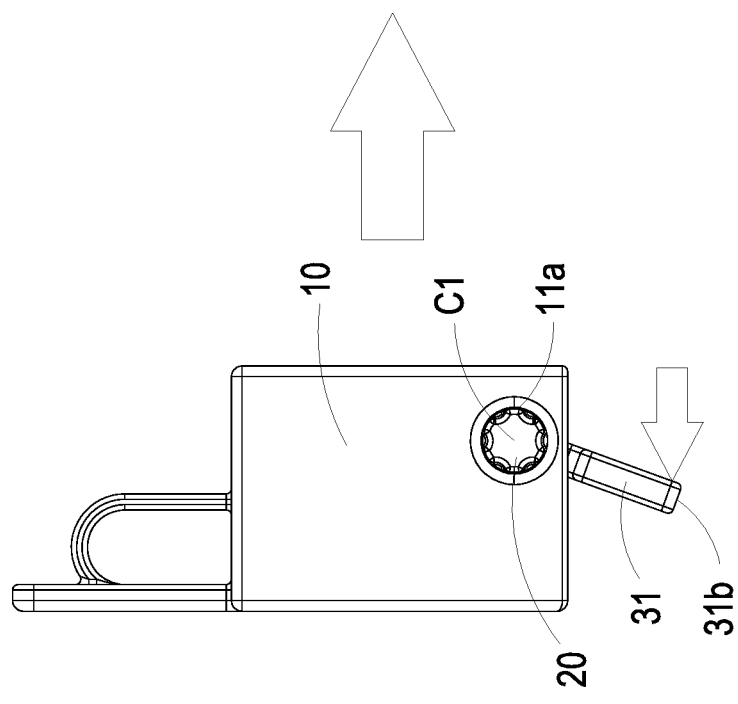
FIG. 6 is a first exemplary diagram illustrating the detection device subjected a force by the abnormal object during detecting in the printing path according to the first embodiment of the present disclosure.
Figure 6:
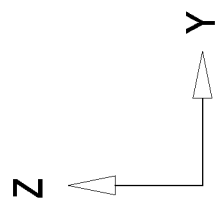
Figure 7:
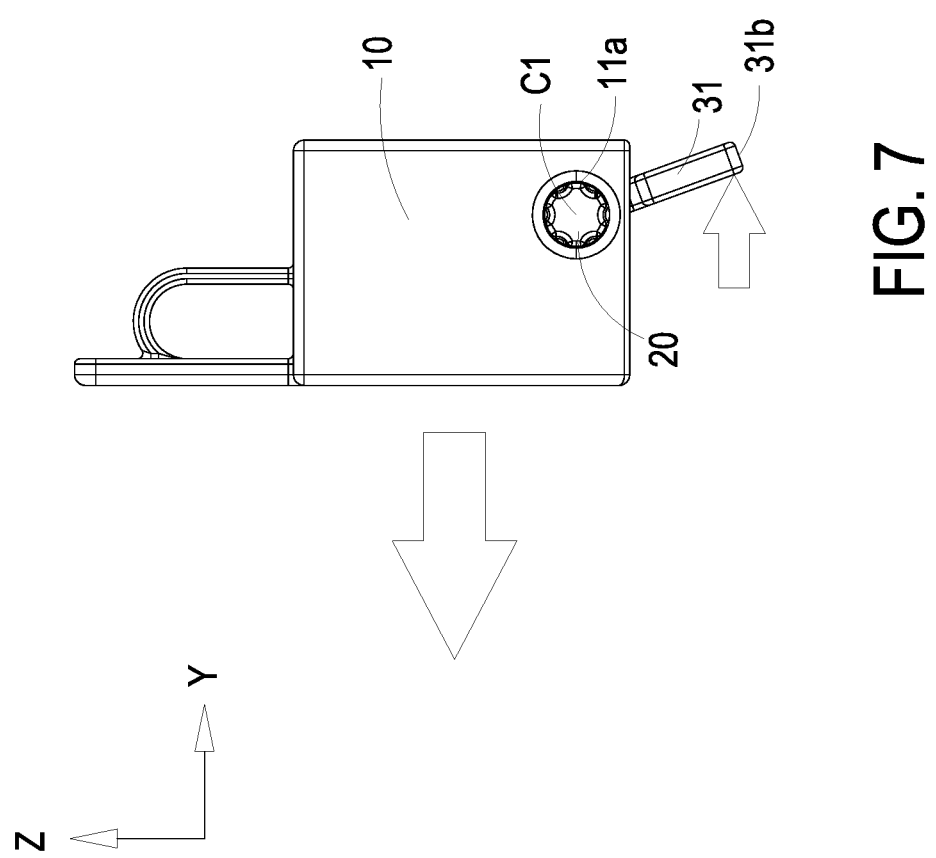
FIG. 7 is a second exemplary diagram illustrating the detection device subjected a force by the abnormal object during detecting in the printing path according to the first embodiment of the present disclosure.

FIG. 5 shows the detection device operated in an initial status according to the first embodiment of the present disclosure. FIG. 6 is a first exemplary diagram illustrating the detection device subjected a force by the abnormal object during detecting in the printing path according to the first embodiment of the present disclosure. FIG. 7 is a second exemplary diagram illustrating the detection device subjected a force by the abnormal object during detecting in the printing path according to the first embodiment of the present disclosure. Please refer to FIGS. 1 to 7. In the embodiment, when the detection device 1 is utilized to detect the abnormal object in the printing path, for example along the Y axis, as shown in FIG. 6, the at least two flexible portions 40a, 40b and the first rotation shaft 20 are coaxial, and arranged along the first central axis C1. When the detection plate 31 is forced to rotate and make the at least two spiral flexible portions 40a, 40b deformed, the at least two spiral flexible portions 40a, 40b and the first rotation shaft 20 are kept along the central axis C1. Namely, the central axis C1 is maintained. Thus, a stable initial torque is provided to the detection plate 31. In the embodiment, when the detection device 1 is utilized to detect the abnormal object in the printing path, for example opposite to the Y axis, as shown in FIG. 7, the at least two flexible portions 40a, 40b and the first rotation shaft 20 are coaxial, and arranged along the first central axis C1. When the second side 31b of the detection plate 31 is forced to rotate and make the at least two spiral flexible portions 40a, 40b deformed, the at least two spiral flexible portions 40a, 40b and the first rotation shaft 20 are kept along the central axis C1. Namely, the central axis C1 is maintained. In that, the stable initial torque as the same as the foregoing example is provided to the detection plate 31. Notably, since the force generated due to the deformation of the at least two flexible portions 40a, 40b is not orthogonal to the first rotation shaft 20, none of friction is generated between the detection plate 31 and the first frame body 10, and it is beneficial to avoid the problem of detection delay. In addition, the deformation of the at least two flexible portions 40a, 40b is generated along the first central axis C1 of the first rotation shaft 20, and the initial torque is formed along the first central axis C1 of the first rotation shaft 20 for the detection plate 31. Moreover, since a certain gap is maintained between the two ends of the detection plate 31 and the first frame body 10, none of friction is generated therebetween. Thus, the detection device 1 applied to the printer can respond immediately when the abnormal objects are detected in the print path. In addition, the initial torque generated by the at least two flexible portions 40a, 40b along the first central axis C1 of the first rotation shaft 20 also has advantage of overcoming the axial vibration, which is caused by the vibration of the detection device 1 of the printer during high-speed motion. It is beneficial to reduce the generation of noise.

Figure 8:
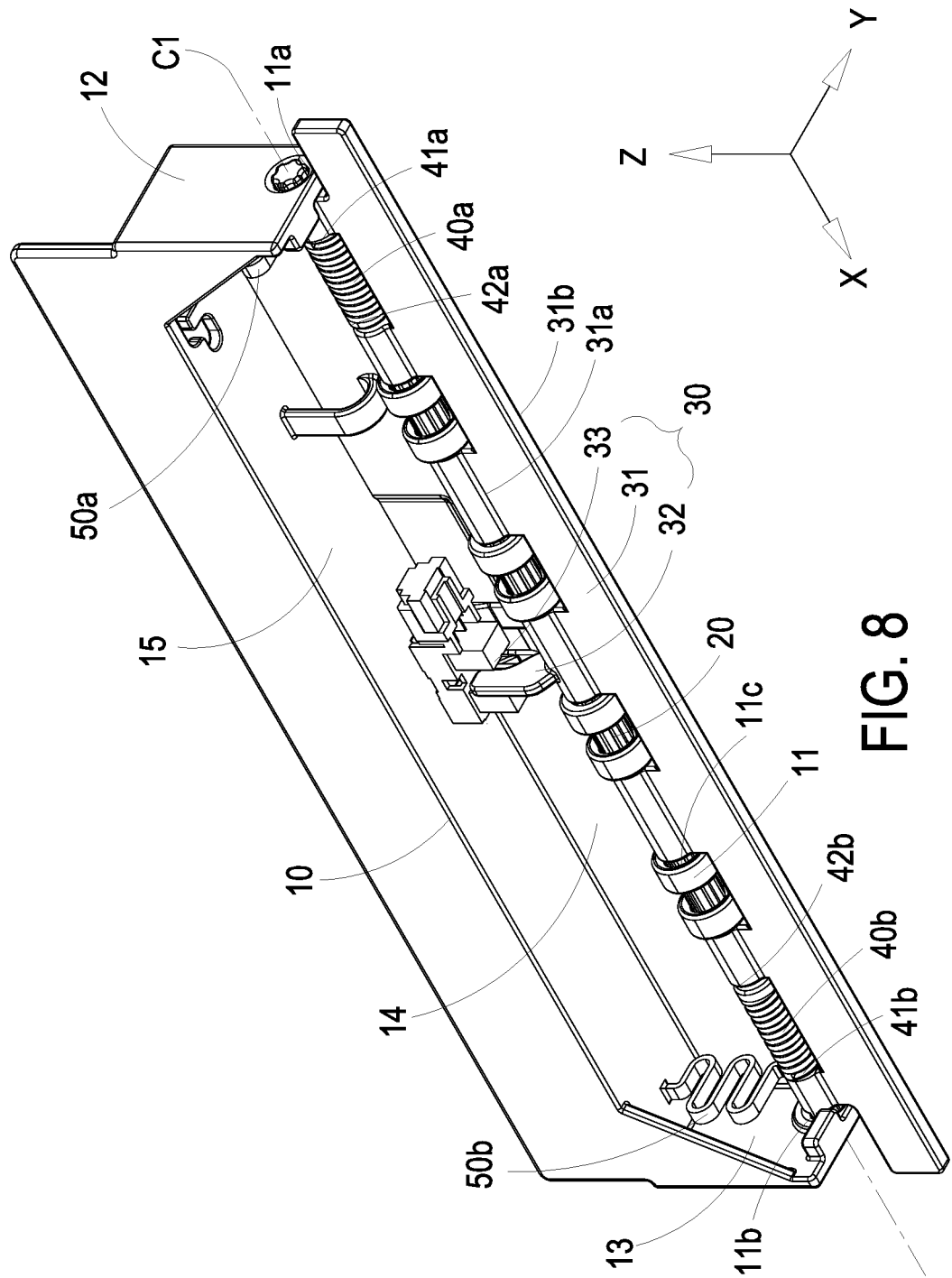
FIG. 8 is a schematic structural view illustrating a detection device according to a second embodiment of the present disclosure.
Figure 9:
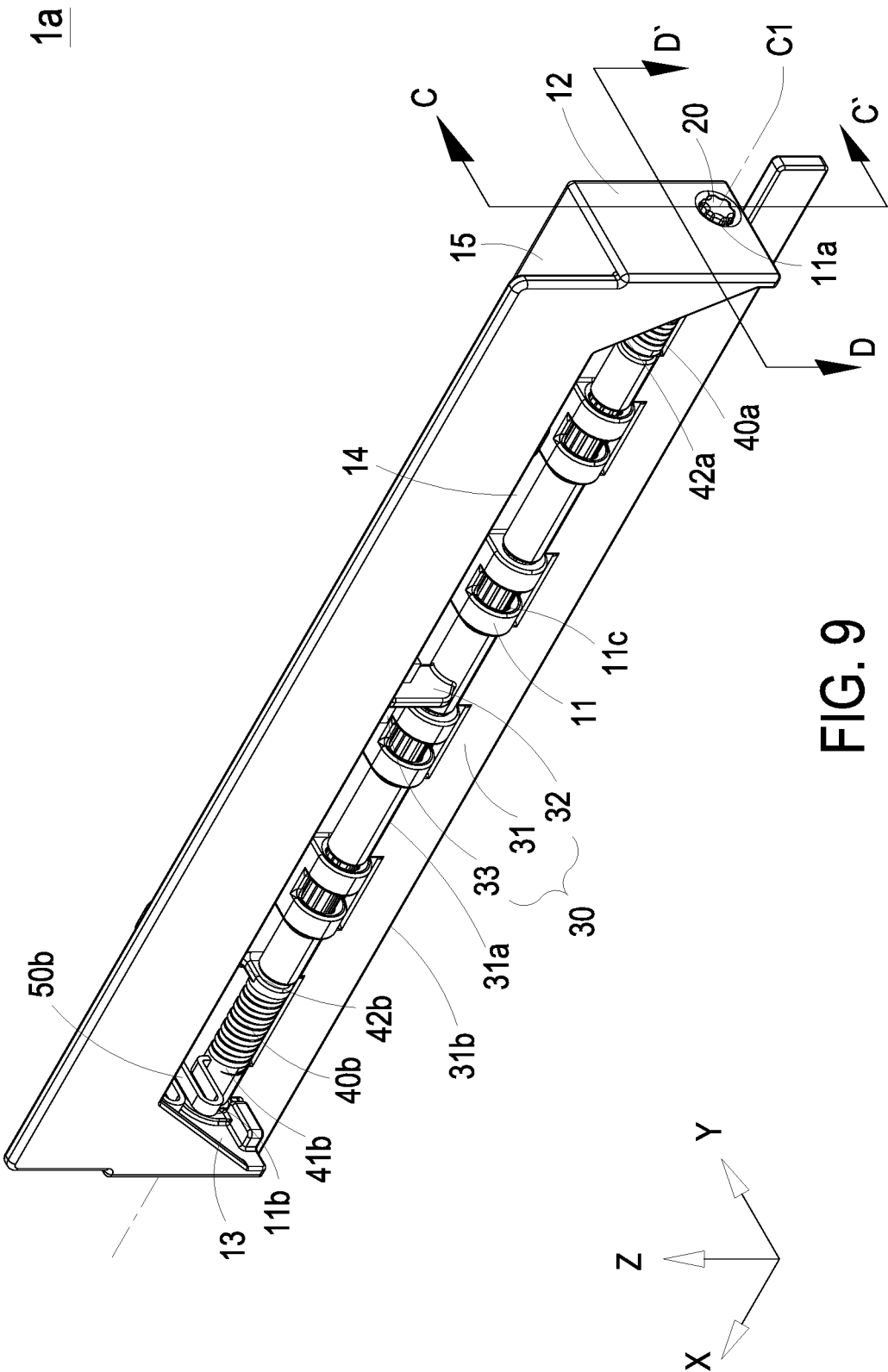
FIG. 9 is a schematic structural view illustrating the detection device according to the second embodiment of the present disclosure and taken from a different perspective.
Figure 10:
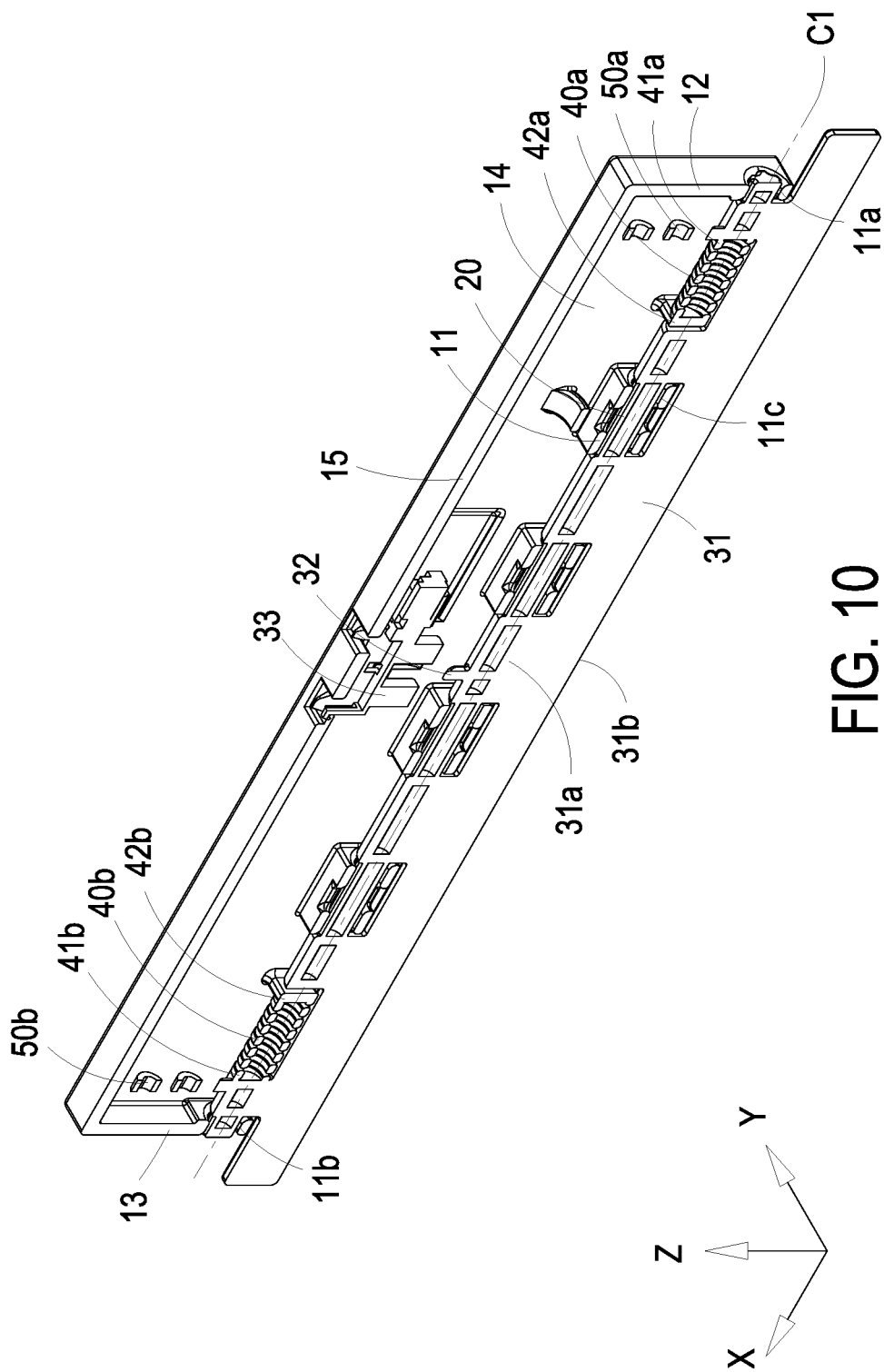
FIG. 10 is a sectional structural view taken along line CC' in FIG. 9.
Figure 11:
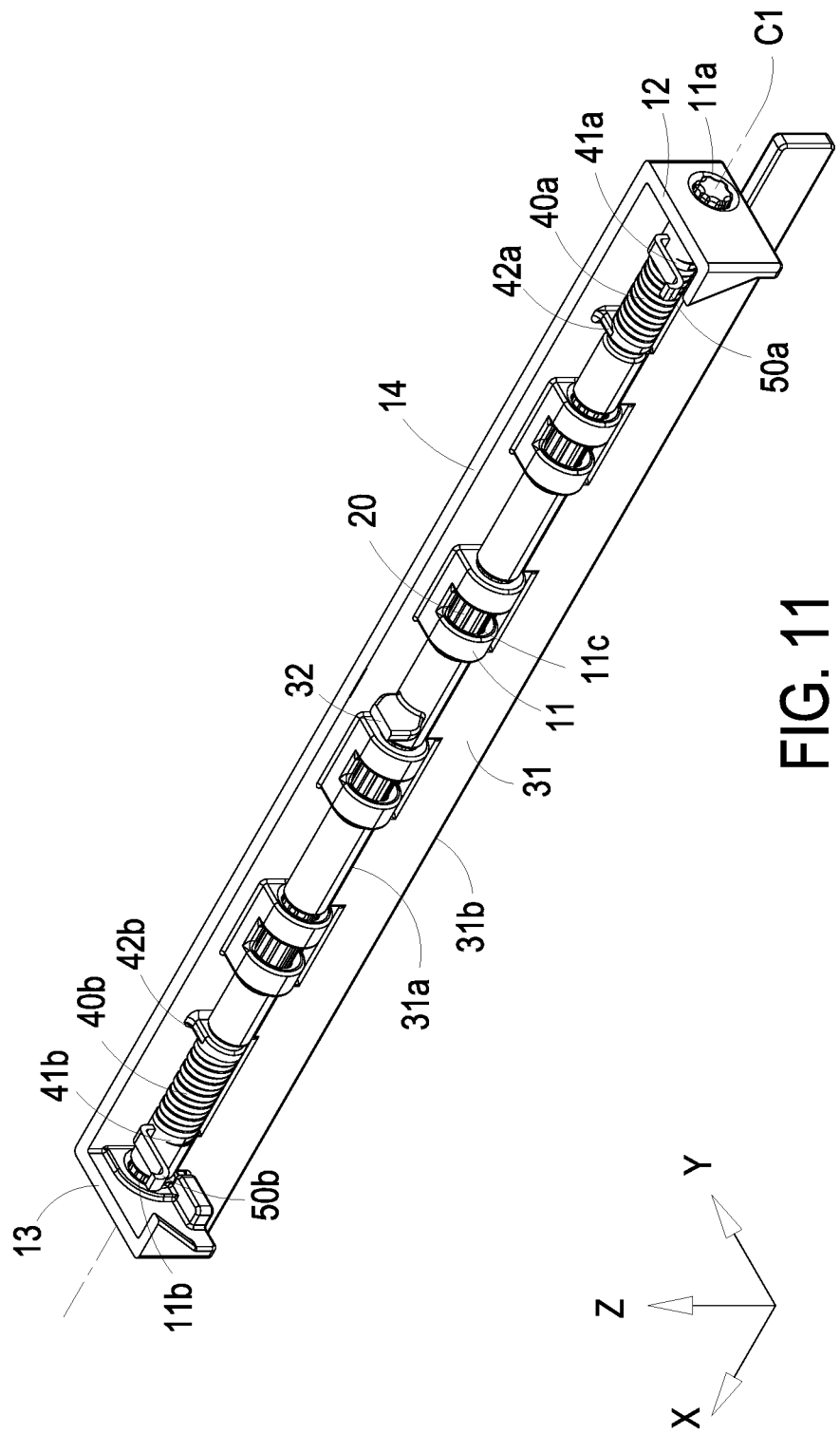
FIG. 11 is a sectional structural view taken along line DD' in FIG. 9.

FIG. 8 is a schematic structural view illustrating a detection device according to a second embodiment of the present disclosure. FIG. 9 is a schematic structural view illustrating the detection device according to the second embodiment of the present disclosure and taken from a different perspective. FIG. 10 is a sectional structural view taken along line CC' in FIG. 9. FIG. 11 is a sectional structural view taken along line DD' in FIG. 9. In the embodiment, the structures, elements and functions of the detection device 1a are similar to those of the detection device 1 in FIGS. 1 to 7. The elements and features indicated by the numerals similar to those of the first embodiment mean similar elements and features, and are not redundantly described herein. In the embodiment, the detection device 1a further includes at least two first auxiliary flexible portions 50a, 50b. The at least two first auxiliary flexible portions 50a, 50b are spatially corresponding to the at least two flexible portions 40a, 40b, and in connection between the first rotation shaft 20 and the first frame body 10. Preferably but not exclusively, the first auxiliary flexible portion 50a is an S-shaped flexible structure and is integrally formed into one piece with the first frame body 10 and the first rotation shaft 20. Moreover, the first auxiliary flexible portion 50a includes a first end in connection with the first rotation shaft 20, and a second end in connection with the top plate 15 of the first frame body 10. Preferably but not exclusively, the first auxiliary flexible portion 50b is an S-shaped flexible structure and is integrally formed into one piece with the first frame body 10 and the first rotation shaft 20. Moreover, the first auxiliary flexible portion 50a includes a first end in connection with the first rotation shaft 20, and a second end in connection with the top plate 15 of the first frame body 10. Preferably but not exclusively, the first end of the first auxiliary flexible portion 50a and the first rotation shaft 20 have a connection point opposite to a connection point of the first side 31a of the detection plate 31 and the first rotation shaft 20. The first end of the first auxiliary flexible portion 50b and the first rotation shaft 20 have a connection point opposite to a connection point of the first side 31a of the detection plate 31 and the first rotation shaft 20. Notably, by providing the first auxiliary flexible portions 50a, 50b, the initial torque provided to the detection plate 31 is increased. Since the first auxiliary flexible portions 50a, 50b are connected between the top plate 15 of the first frame body 10 and the first rotation shaft 20, when the detection plate 31 drives the first rotation shaft 20 to rotate, the ends of the first auxiliary flexible portions 50a, 50b connected to the first rotation shaft 20 generates an angle change and a height change, wherein the angle change is greater than the height change. In case that a large torque is provided, when the detection plate 31 drives the first rotation shaft 20 to rotate, a non-axial force generated is not excessive relative to the first rotation shaft 20. It is advantage of reducing the friction of rotation, and making the detection plate 31 more sensitive when the detection plate 31 touches the abnormal object. Thus, the abnormal object is detected in time, the printer can be stopped immediately and the accident is avoided.

Figure 12:
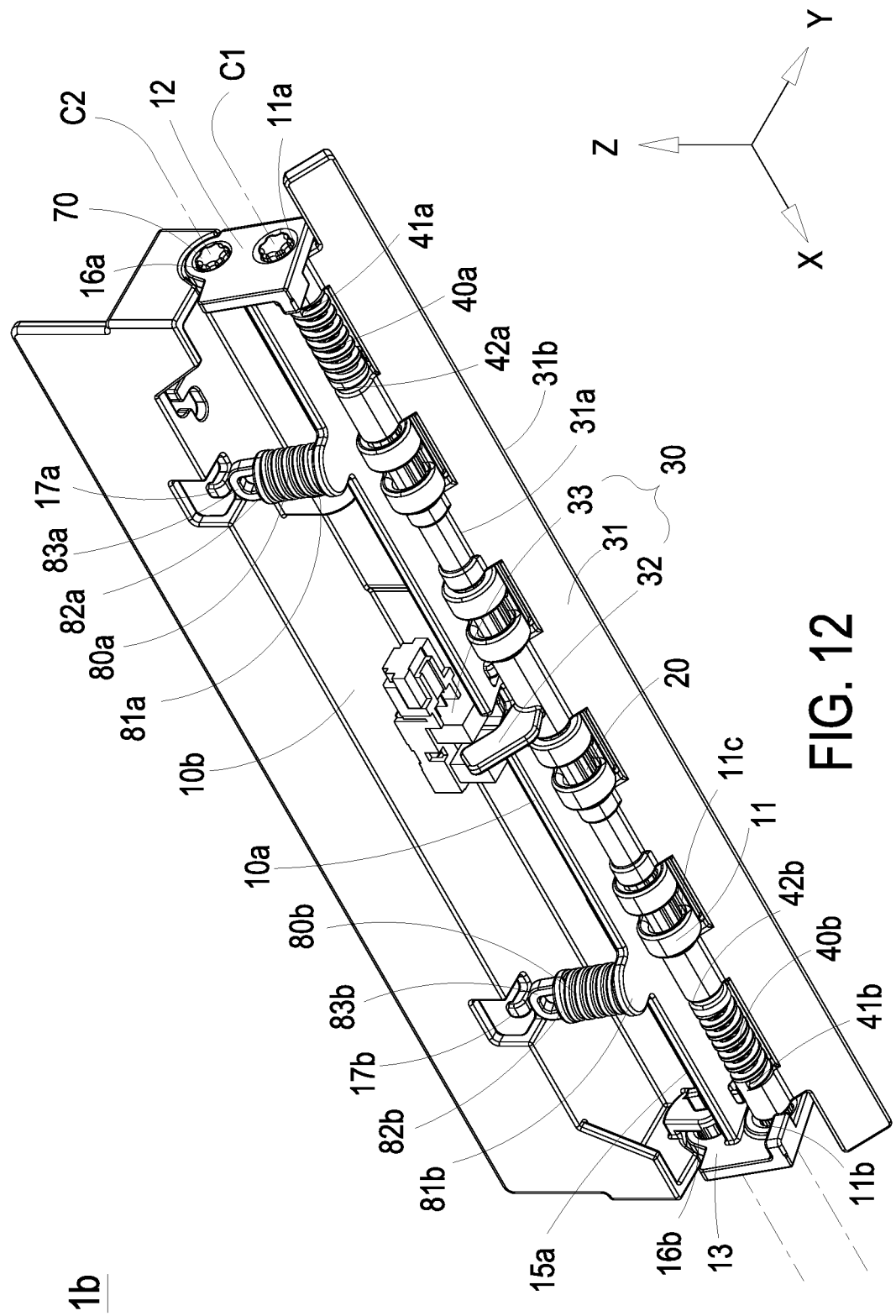
FIG. 12 is a schematic structural view illustrating a detection device according to a third embodiment of the present disclosure.
Figure 13:
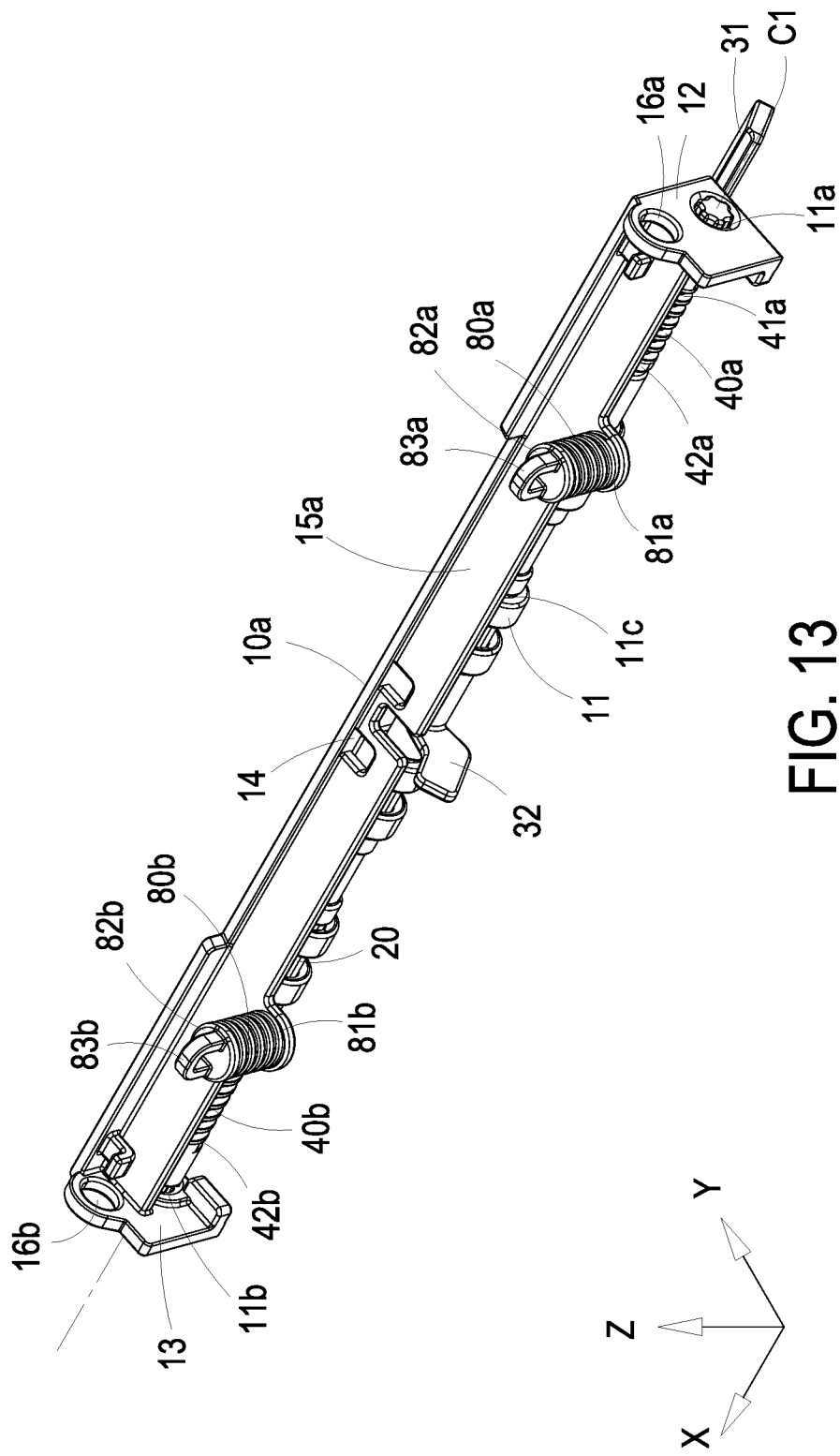
FIG. 13 is a schematic structural view illustrating the components disposed on the first frame body of the detection device according to the third embodiment of the present disclosure.
Figure 14:
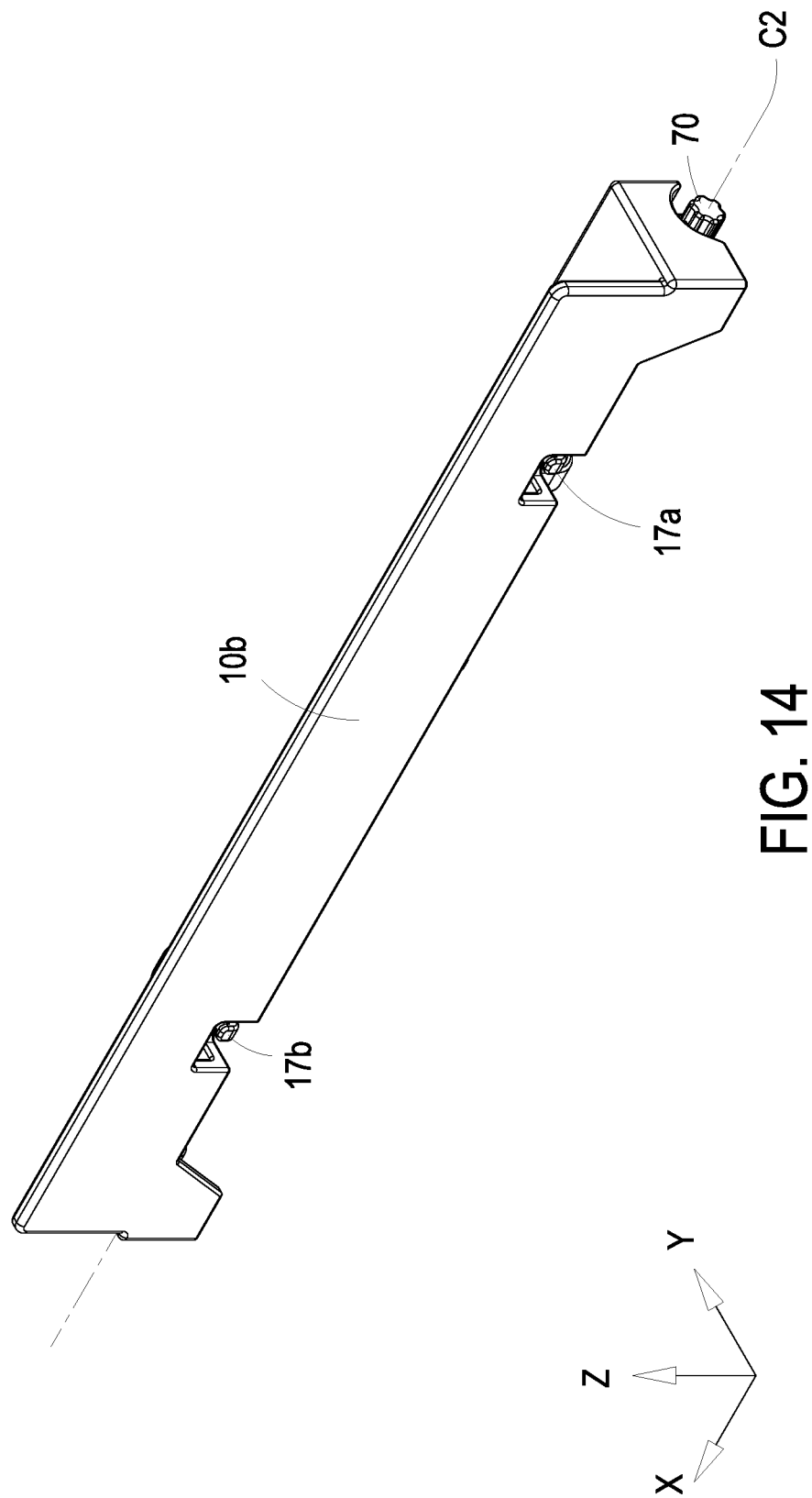
FIG. 14 is a schematic structural view illustrating the components disposed on the second frame body of the detection device according to the third embodiment of the present disclosure.

FIG. 12 is a schematic structural view illustrating a detection device according to a third embodiment of the present disclosure. FIG. 13 is a schematic structural view illustrating the components disposed on the first frame body of the detection device according to the third embodiment of the present disclosure. FIG. 14 is a schematic structural view illustrating the components disposed on the second frame body of the detection device according to the third embodiment of the present disclosure. In the embodiment, the structures, elements and functions of the detection device 1b are similar to those of the detection device 1 in FIGS. 1 to 7. The elements and features indicated by the numerals similar to those of the first embodiment mean similar elements and features, and are not redundantly described herein. In the embodiment, the detection device 1b further includes a first frame body 10a, a second frame body 10b and at least two second auxiliary flexible portions 80a, 80b. The second frame body 10b includes a second rotation shaft 70, which is pivotally connected to the first frame body 10a and has a second central axis C2 parallel to the first central axis C1. In the embodiment, the first frame body 10a further includes at least two third pivoting holes 16a, 16b, which are disposed on the two opposite lateral plates 12, 13, respectively. The second rotation shaft 70 of the second frame body 10b is pivotally connected to the first frame body 10a through the at least two third pivoting holes 16a, 16b, so that the first frame body 10a is capable of rotating relative to the second frame body 10b around the second central axis C2. Preferably but not exclusively, the at least two second auxiliary flexible portions 80a, 80b are a spiral flexible structure, respectively, which are connected between the first frame body 10a and the second fame body 10b. The at least two second auxiliary flexible portions 80a, 80b are configured to provide an elastic restoring force when the first frame body 10a is rotated relative to the second frame body 10b around the second central axis C2. In the embodiment, the second frame body 10b includes at least two first connecting components 17a, 17b, which spatially correspond to the at least two second auxiliary flexible portions 80a, 80b, respectively. Preferably but not exclusively, the at least two first connecting components 17a, 17b are a hook, respectively. In the embodiment, the second auxiliary flexible portion 80a includes a first end 81a and a second end 82a opposite to each other, and a second connecting component 83a. Preferably but not exclusively, the first end 81a is in connection with the top plate 15a of the first frame body 10a. Preferably but not exclusively, the second connecting component 83a is a snap ring and disposed at the second end 82a. The second connecting component 83a is engaged with the corresponding first connecting component 17a. Similarly, the second auxiliary flexible portion 80b includes a first end 81b and a second end 82b opposite to each other, and a second connecting component 83b. Preferably but not exclusively, the first end 81b is in connection with the top plate 15a of the first frame body 10a. Preferably but not exclusively, the second connecting component 83b is a snap ring and disposed at the second end 82b. The second connecting component 83b is engaged with the corresponding first connecting component 17b. Thus, the at least two second auxiliary flexible portions 80a, 80b are in connection between the first frame body 10a and the second frame body 10b. Moreover, an elastic restoring force is provided when the first frame body 10a is rotated relative to the second frame body 10b around the second central axis C2.

Figure 15:
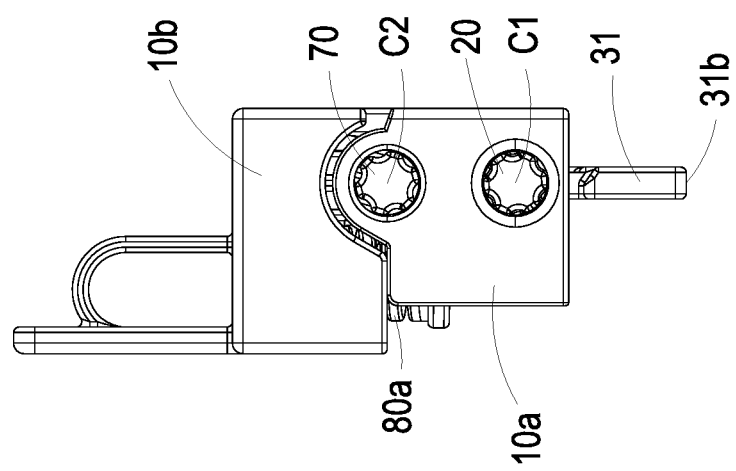
FIG. 15 shows the detection device operated in an initial status according to the third embodiment of the present disclosure.
Figure 15:
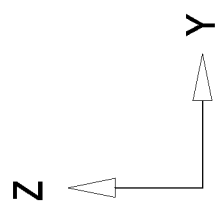
Figure 16:
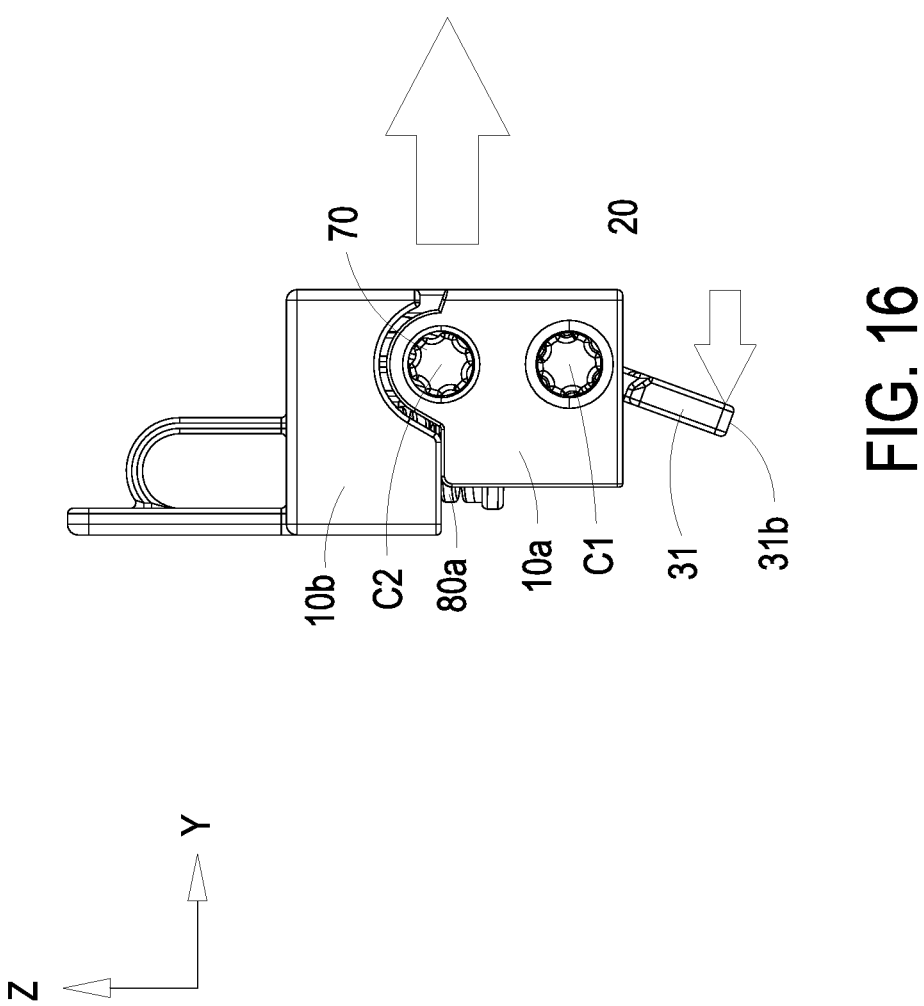
FIG. 16 is an exemplary diagram illustrating the detection device subjected a force by the abnormal object during detecting in the printing path.
Figure 17:
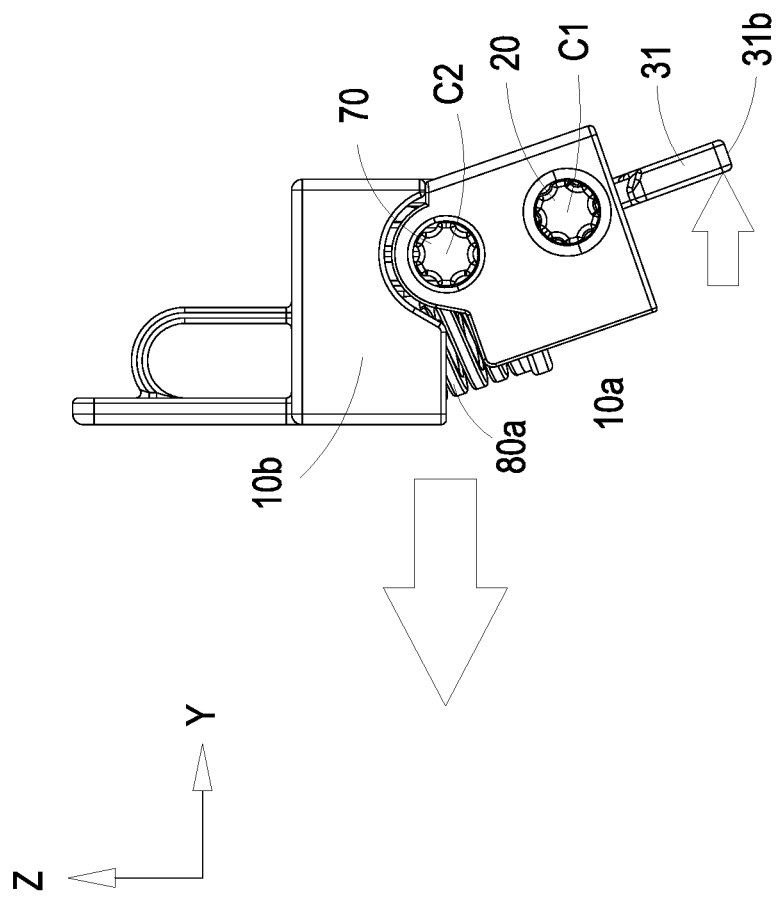
FIG. 17 is an exemplary diagram illustrating the detection device subjected collision during detecting in the printing path.

FIG. 15 shows the detection device operated in an initial status according to the third embodiment of the present disclosure. FIG. 16 is an exemplary diagram illustrating the detection device subjected a force by the abnormal object during detecting in the printing path. FIG. 17 is an exemplary diagram illustrating the detection device subjected collision during detecting in the printing path. Please refer to FIGS. 12 to 17. In the embodiment, the detection device 1b adopts a design of detecting in one-way printing path. When the detection device 1*b* is utilized to detect the abnormal object in the printing path, for example along the Y axis, as shown in FIG. 16, the at least two flexible portions 40*a*, 40*b* and the first rotation shaft 20 are coaxial, and arranged along the first central axis C1. When the second side 31*b* of the detection plate 31 is forced to rotate and make the at least two spiral flexible portions 40*a*, 40*b* deformed, the at least two spiral flexible portions 40*a*, 40*b* and the first rotation shaft 20 are kept along the first central axis C1. Namely, the first central axis C1 is maintained. A stable initial torque is provided to the detection plate 31. In addition, when the second side 31*b* of the detection plate 31 is forced, the first frame body 10*a* and the second frame body 10*b* abut against each other, and the first frame body 10*a* is not rotated relative to the second frame body 10*b* in the opposite direction of Y axis. Therefore, the abnormal object detection of detection module 1*b* is not affected. On the other hand, when the detection device 1*b* is moved in the printing path, for example opposite to the Y axis, as shown in FIG. 17, a rotational freedom is maintained between the first frame body 10*a* and the second frame body 10*b*. If the second side 31*b* of the detection plate 31 or the first frame body 10*a* is forced due to an accidental touch or an accidental collision, the first frame body 10*a* is rotated relative to the first frame body 10*b* through the second central axis C2 as a rotation center. Namely, it is beneficial to prevent the detection device 1*b* from being damaged by the accidental touch or the accidental collision in the printing path. With the elastic restoring force provided by the at least two second auxiliary flexible portions 80*a*, 80*b*, the first frame body 10*a* and the second frame body 10*b* of the detection device 1*b* can be restored to the initial state, as shown in FIG. 15. Certainly, the arrangements of the second auxiliary flexible portions 80*a*, 80*b* and the first auxiliary flexible portions 50*a*, 50*b* described as the above are adjustable according to the practical requirements. The present disclosure is not limited thereto.

In summary, the present disclosure provides a detection device applied to a printer. By combining the coaxial elastic structures with the detection plate, the same initial torque is provided when the detection plate reciprocates in the printing path, so as to ensure that the detection sensitivity of the detection plate is consistent. When an abnormal object is dropped into the printing path, it can be detected in time, to avoid the high-speed collision and the damage to the machine or personnel. The detection device having coaxial elastic structures is produced into one piece by for example the additive manufacturing technology. At least two spiral flexible portions are formed on both sides of the rotation shaft, respectively, and the detection plate is connected to the rotation shaft and pivotally connected to the frame of the detection device. It is advantageous of eliminating a lot of complicated assembly procedures. Since the at least two spiral flexible portions and the rotation shaft are coaxial, when the detection plate is forced to rotate in the forward direction or the reverse direction, the at least two spiral flexible portions on the rotation shaft are deformed, and the central axis of the at least two spiral flexible portions and the rotation shaft is maintained. Thus, a stable initial torque is provided to the detection plate. On the other hand, since the force generated due to the deformation of the at least two spiral flexible portions is not orthogonal to the rotation shaft, none of friction is generated between the detection plate and the frame body, and it is beneficial to avoid the problem of detection delay. In addition, the deformation of the at least two spiral flexible portions is generated along the central axis of the rotation shaft, and the initial torque is formed along the central axis of the rotation shaft for the detection plate. Moreover, since a certain gap is maintained between the two ends of the detection plate and the frame body, none of friction is generated therebetween. Thus, the detection device applied to the printer can respond immediately when the abnormal object is detected in the print path. In addition, the initial torque generated by the at least two spiral flexible portions in the axial direction of the rotation shaft also has advantage of overcoming the axial vibration, which is caused by the vibration of the detection device of the printer during high-speed motion. It is beneficial to reduce the generation of noise. In addition, the detection device of the present disclosure further provides a first auxiliary flexible portion such as an S-shaped flexible structure, so as to increase the initial torque provided to the detection plate. Since the first auxiliary flexible portion is connected between the frame body and the rotation shaft, when the detection plate drives the rotation shaft to rotate, one end of the first auxiliary flexible portion connected to the rotation shaft generates an angle change and a height change, wherein the angle change is greater than the height change. In case that a large torque is provided, when the detection plate drives the rotation shaft to rotate, a non-axial force generated is not excessive relative to the rotation shaft. It is advantage of reducing the friction of rotation, and making the detection plate more sensitive when the detection plate touches the abnormal object. Thus, the abnormal object is detected in time, the printer can be stopped immediately and the accident is avoided. On the other hand, when the detection device adopts a design of detecting in one-way printing path, the frame body further includes a first frame body and a second frame body, which are pivotally connected to each other by a second rotation axis and have second auxiliary flexible portions, for example spiral flexible structures. The second auxiliary flexible portions are connected between the first frame body and the second frame body to provide an elastic restoring force. It is beneficial to prevent the detection device from being damaged by an accidental touch or an accidental collision in the printing path.

While the disclosure has been described in terms of what is presently considered to be the most practical and preferred embodiments, it is to be understood that the disclosure needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A detection device configured to detect an abnormal object in a printing path of a printer, and comprising:
  a first frame body;
  a first rotation shaft pivotally connected to the first frame body and having a first central axis spatially corresponding to and orthogonal to the print path;
  at least two flexible portions disposed on two opposite ends of the first rotation shaft along the first central axis, respectively, and configured to provide the first rotation shaft with an initial torque, wherein each of the at least two flexible portions comprises a first end in connection with the first rotation shaft and a second end in connection with the first frame body; and
  a detection module configured to detect a rotation of the first rotation shaft relative to the first frame body and comprising a detection plate, wherein the detection plate comprises a first side and a second side opposite to each other, and the first side is in connection with the first rotation shaft, wherein when the second side of the detection plate is forced by the abnormal object during detecting in the printing path, the detection plate drives the first rotation shaft against the initial torque and is rotated around the first central axis, so that the detection module detects the rotation of the first rotation shaft and the detection plate.

2. The detection device according to claim 1, wherein the detection module further comprises:
   an optical sensor disposed on the first frame; and
   a detecting portion spatially corresponding to the optical sensor and in connection with the first rotation shaft, wherein when the second side of the detection plate is subjected a force by the abnormal object during detecting in the printing path, the detection plate drives the first rotation shaft to rotate the detecting portion with a displacement, and the optical sensor detects the displacement of the detecting portion, so that the detection module detects the rotation of the first rotation shaft and the detection plate.

3. The detection device according to claim 1, wherein the first frame body comprises at least two first pivoting holes, and the first rotation shaft is pivotally connected to the first frame body through the at least two first pivoting holes.

4. The detection device according to claim 1, wherein the first frame body comprises a plurality of pivoting portions having a plurality of second pivoting holes, wherein the first rotation shaft is pivotally connected to the first frame body through the plurality of second pivoting holes.

5. The detection device according to claim 1, wherein the flexible portion is a spiral flexible structure and is integrally formed into one piece with the first rotating shaft.

6. The detection device according to claim 1, further comprising at least two first auxiliary flexible portions spatially corresponding to the at least two flexible portions and in connection between the first rotation shaft and the first frame body, wherein each of the at least two first auxiliary flexible portions comprises a first end in connection with the first rotation shaft, and a second end in connection with the first frame body.

7. The detection device according to claim 6, wherein the first end of the first auxiliary flexible portion and the first rotation shaft have a connection point opposite to a connection point of the first side of the detection plate and the first rotation shaft.

8. The detection device according to claim 6, wherein the first auxiliary flexible portion is an S-shaped flexible structure, and is integrally formed into one piece with the first frame body and the first rotation shaft.

9. The detection device according to claim 1, further comprising:
   a second frame body comprising a second rotation shaft, which is pivotally connected to the first frame body and has a second central axis parallel to the first central axis; and
   at least two second auxiliary flexible portions connected between the first frame body and the second frame body, and configured to provide an elastic restoring force when the first frame body is rotated relative to the second frame body around the second central axis.

10. The detection device according to claim 9, wherein the second auxiliary flexible portion is a spiral flexible structure.

11. The detection device according to claim 9, wherein the second frame body comprises at least two first connecting components spatially corresponding to the at least two second auxiliary flexible portions, wherein each of the at least two second auxiliary flexible portions comprises a first end and a second end opposite to each other, and a second connecting component, wherein the first end is in connection with the first frame body, the second connecting component is disposed at the second end, and the second connecting component is engaged with the corresponding first connecting component, so that the at least two second auxiliary flexible portions are in connection with the second frame body.

* * * * *